United States Patent [19]

Schmidt, Jr. et al.

[11] Patent Number: 4,526,688
[45] Date of Patent: Jul. 2, 1985

[54] PRESSURE FILTER WITH VIBRATORY IMPACTOR

[75] Inventors: Henry Schmidt, Jr., Hinsdale; Allen E. Cederholm, Western Springs; James F. Zievers, LaGrange, all of Ill.

[73] Assignee: Industrial Filter & Pump Mfg. Co., Cicero, Ill.

[21] Appl. No.: 308,283

[22] Filed: Oct. 5, 1981

[51] Int. Cl.³ .............................................. B01D 35/20
[52] U.S. Cl. .................................. 210/323.2; 210/332; 210/388; 210/457; 210/489; 210/497.01
[58] Field of Search ...................... 210/315, 323.2, 332, 210/346, 347, 388, 457, 489, 497.01

[56] References Cited

U.S. PATENT DOCUMENTS 3,100,190  8/1963  Hobson ............................... 210/332
3,212,643  10/1965  Schmidt, Jr. et al. .............. 210/332
3,695,443  10/1972  Schmidt, Jr. ........................ 210/315
3,867,291  2/1975  Schmidt, Jr. et al. .......... 210/332 X

*Primary Examiner*—David Sadowski
*Attorney, Agent, or Firm*—Edmond T. Patnaude

[57] ABSTRACT

A pressure filter utilizes a vibratory impactor for imparting vertically directed high frequency shock waves to a rigid manifold from which a plurality of rigid filter tubes incorporate a fine mesh sleeve held tightly by spaced elastic bands against a unitary plastic core having inner and outer tubes interconnected by integral web portions.

13 Claims, 7 Drawing Figures

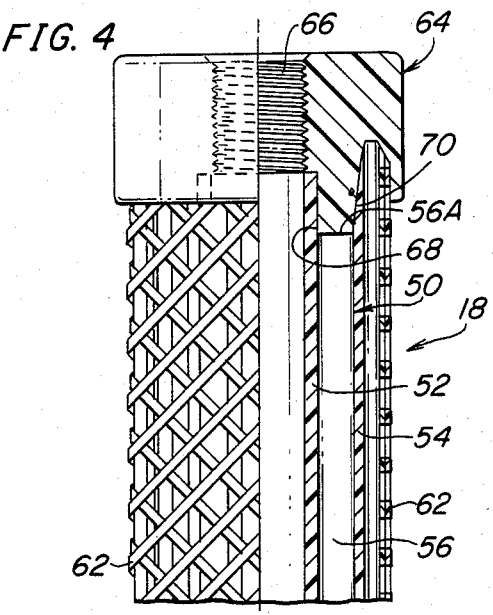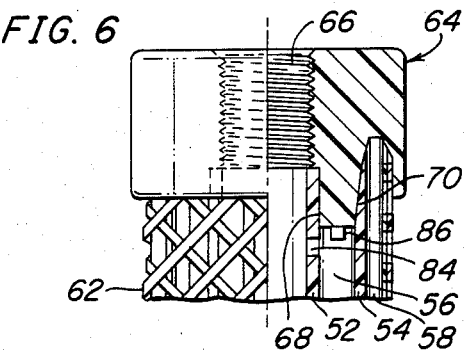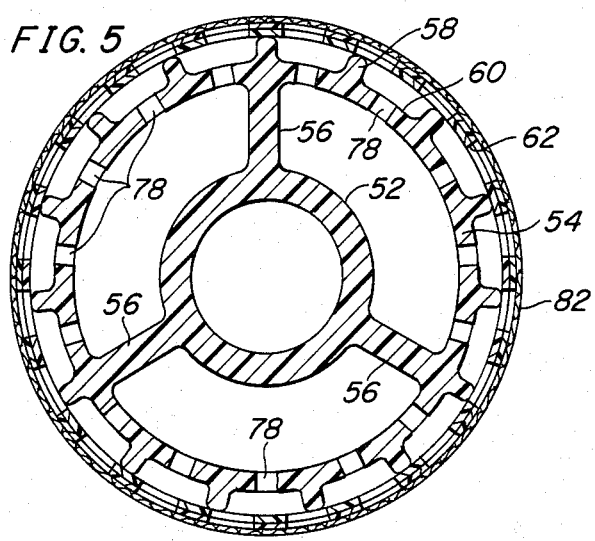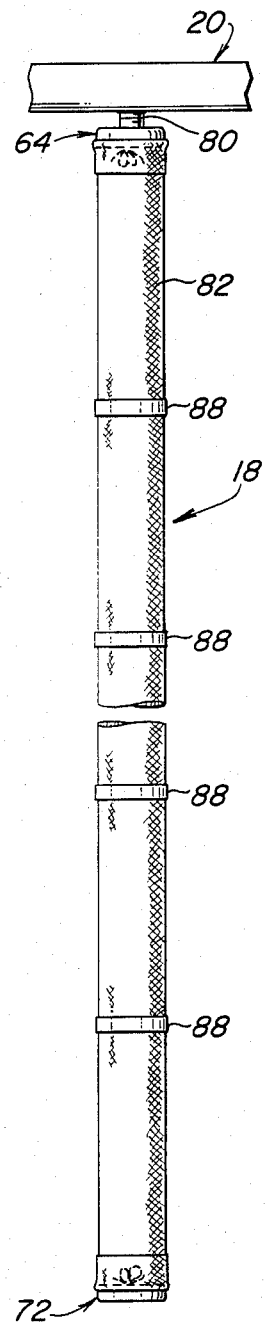

PRESSURE FILTER WITH VIBRATORY IMPACTOR

The present invention relates in general to the art of pressure filtration wherein a filtrate passes through a porous cake deposited on the surface of a perforate filter element into a cavity in the element, and it relates in particular to an improved method and apparatus for cleaning the filter element after a filter cake has been deposited thereon and to a new and improved tubular filter element.

BACKGROUND OF THE INVENTION

In our copending application, now U.S. Pat. No. 4,289,630, there is disclosed a pressure filter which incorporates a vibratory impactor for imparting vertical shock waves to a rigid outlet manifold from which a plurality of filter elements are suspended. In that filter the manifold is mounted to the tank by resilient members such as rubber bumper springs or by mechanical springs wherefor the vibrational waves are transmitted directly to the filter elements and are not appreciably dampened by the massive tank.

One type of filter element which finds use with the above described pressure filter is described in U.S. Pat. No. 3,695,443, assigned to the same assignee as is the present invention. That type of filter element is tubular in construction and has a fine mesh sleeve formed of woven cloth or the like which fits over a rigid, tubular core member. In those applications where the length-to-diameter ratio of the filter element is more than about eight-to-one, less than perfect cleaning may occur due to relative movement between the core member and the filter sleeve and a consequent low efficient wave transmission to the sleeve. It would be desirable, therefor, to improve the transmission of the vibratory shock waves from the core member to the entire filter sleeve in relatively long filter tubes.

Another problem which is sometimes encountered with relatively long filter tubes is the tendency for the tubes to bow and thus adversely affect the transmission of vibrational shock waves from the cores to those areas of the mesh sleeves where the sleeves become spaced from the cores. It would, therefore, be desirable to provide a filter tube having greater physical strength to resist bowing without appreciably increasing the weight of the tube or adversely affecting its operating characteristics.

SUMMARY OF THE INVENTION

Briefly, there is provided in accordance with the present invention a new and improved filter having improved means for removing filter cakes deposited on the filter elements during the filtration cycle. This improved filter employs novel means for imparting vertically directed shock waves to the filter elements suspended from an outlet manifold, and it employs novel filter tubes which include means for increasing the efficiency of vibratory shock wave transmission from a vibratory impactor to the mesh sleeves mounted over the core members of the filter tubes.

In the preferred embodiment of this invention a relatively rigid outlet manifold rests directly on a plurality of shelf brackets fixedly mounted to the inner wall of the associated filter tank. A vibratory impactor which generates high frequency, low amplitude shock waves is mounted over the top of the manifold, and the filter elements are fixedly mounted to the manifold and hang downwardly therefrom. Operation of the impactor causes shock waves to travel down the filter elements to dislodge the filter cakes previously deposited on the outer surfaces of the filter elements.

In this preferred embodiment of the invention, the filter elements are filter tubes each having a novel core construction which includes an integral, center blow-down tube connected to a fluted outer tube by means of a plurality of integral webs. This core construction increases the structural strength of the tube to resist bowing, it increases liquid velocity at the bottom of the tube during filtration and during blow-down when air is blown back through the filter tubes, and it provides a plurality of internal pockets between the webs and the top cap of the tube to provide an air bump when the pressure in the filter chamber is rapidly relieved.

In addition to the novel core construction which minimizes bowing of the filter tube, one or more clamping bands surround the mesh sleeve to hold it tightly against the rigid core at spaced locations to assure efficient transmission of the shock waves to all areas of the mesh sleeve. Preferably, the bands are annular elastic members having a narrow width so as not to appreciably reduce the effective area of the filter tube.

GENERAL DESCRIPTION OF THE DRAWINGS

The present invention will be better understood by a reading of the following detailed description taken in connection with the accompanying drawings wherein:

FIG. 4 is an elevational view, partly broken away and partly in cross-section, of a novel filter element embodying the present invention, a plurality of such filter elements being shown in FIG. 1.

FIG. 5 is a cross-sectional view of the filter tube of FIG. 4 taken along the line 5—5 thereof;

FIG. 6 is a cross-sectional view of the top portion of an alternative filter tube construction; and FIG. 7 is an elevational view, partly broken away of a filter tube assembly embodying the invention.

DETAILED DESCRIPTION OF THE INVENTION

Figure 1:
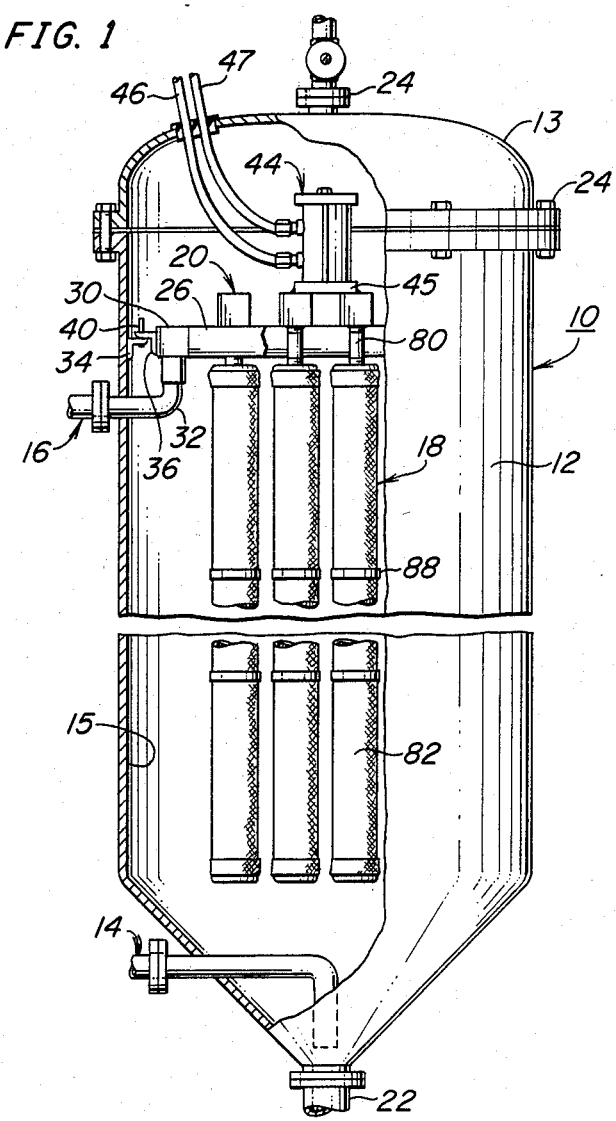
FIG. 1 is an elevational view, partly broken away, of a pressure filter embodying the present invention.
Figure 2:
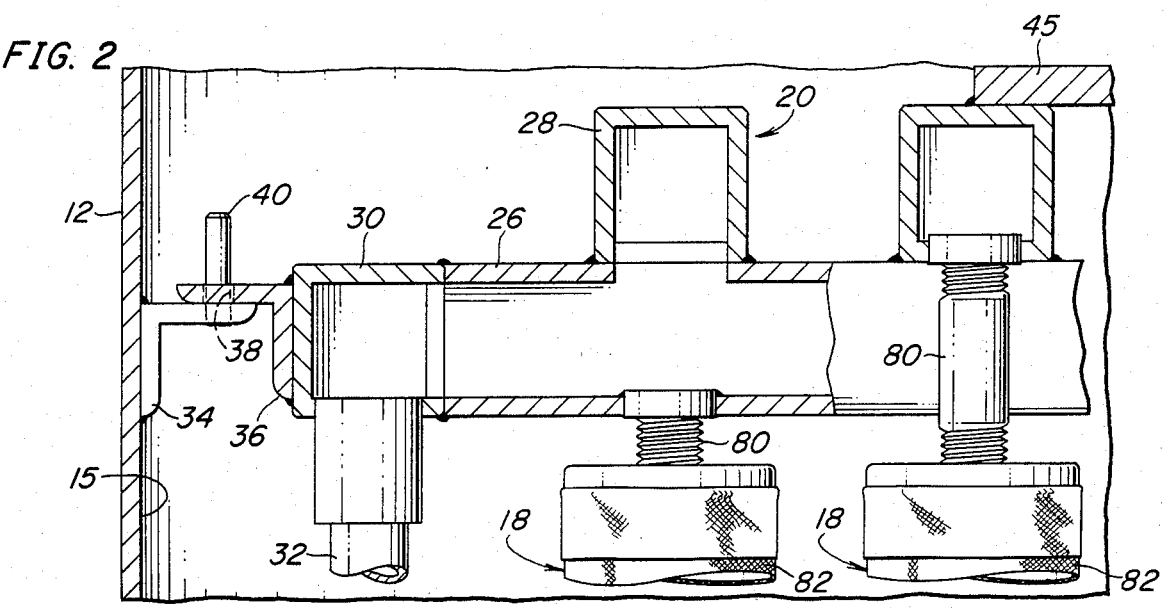
FIG. 2 is an enlarged, cross-sectional view showing the manner in which the outlet manifold and the filter elements are mounted in the filter tank.

Referring particularly to FIGS. 1 and 2, there is shown a pressure filter 10 which comprises as its principal elements a generally cylindrical pressure vessel or tank 12 having a cover 13, a filtrate inlet 14 through which the liquid to be filtered is supplied to the filter chamber 15 within the tank, a liquid outlet 16 through which the effluent exits the filter, and a plurality of rigid, perforate filter elements 18 which are suspended from a rigid outlet manifold 20 connected to the outlet 16. The filter tubes 18 hang freely from the manifold 20 and are spaced from the tank 12 so as to move freely therein during the vibratory cleaning operation. The tank 12 has a generally conical lower wall portion terminating at the bottom at a drain port 22. In the illustrated tank the drain opening is relatively small and is thus suitable for a wet cake or slurry discharge. For a dry cake discharge a much larger area drain is required.

An air inlet-outlet port 24 is mounted in the cover 13 and opens into the top of the filter chamber. Suitable valve means is provided transferring air to and from the tank via the port 24. During use of the filter the cover 13 is sealably secured to the tank by means of suitable gasketing and a plurality of bolts 24.

The outlet manifold 20 is preferably of the well known header-lateral type and comprises a pair of horizontal rigid header tubes 26 connected to a plurality of horizontal rigid lateral tubes 28 which extend transversely to the header tubes 26 over the tops thereof. The tubes 26 and 28 are rectangular in cross-section and have respectively mating openings in the tops of the header tubes 26 and in the bottoms of the lateral tubes 28 so that the lateral tubes drain by gravity into the lower header tubes. The lateral tubes 28 are sealably and fixedly connected to the header tubes 26 as by welding. The ends of the tubes 28 are individually closed while the ends of the header tubes 26 open into a pair of rigid end tubes 30. One of the end tubes 30 is connected to the outlet 16 by a vertically expandable conduit assembly 32, which may be of the telescoping type shown in FIG. 4 of our said copending application.

In order to support the outlet manifold and the filter tubes which it carries, four rigid shelf brackets 34 are affixed as by welding to the inner wall of the tank 12 at ninety degree intervals, and the manifold assembly 20 rests directly on these four shelf brackets. Four angle brackets 36 are affixed as by welding to the manifold and are respectively provided with guide openings 38 which slidably receive respective ones of four vertical guide pins 40 which are threadedly received in respective openings in the horizontal flange portions of the four shelf brackets 34. It may be seen that two of the angle brackets 36 are affixed to the headers 26, the other two brackets 36 being respectively affixed to the ends of the four central ones of the laterals 28 to provide a strong and rigid connection between the brackets 36 and both the header and lateral tubes.

Mounted directly on the top of the manifold 20 is a vibratory impactor 44. The impactor 44 has a mounting plate 45 which is fixedly mounted, as by welding, to the central laterals of the manifold. If desired, the plate 45 may be bolted to a separate mounting plate which lies on and is welded to a number of the lateral tubes. The impactor 44 may be of any suitable type which imparts high frequency vertically directed shock waves to the manifold 20, but is is preferably of the pneumatic type described in U.S. Pat. No. 3,212,643 which generates low amplitude, relatively high frequency, shock wave pattern. Very effective cake removal has been achieved using a frequency of vibration in the range of 3,000 cycles per minute to 4,000 cycles per minute and an amplitude between 0.020 inch and 0.040 inch. As shown a pair of pneumatic lines 46 and 47 are connected to the impactor 44 and sealably extend through the cover 13 to suitable control valves (not shown) and a source of pressurized air (not shown) for controllably operating the impactor 44. It may thus be seen that the impactor 44, the manifold 20, and the filter tubes 18 constitute an integral, rigid unit through which shock waves are transmitted when the impactor 44 is operated. Vertically traveling shock waves are thus transmitted to and through the filter tubes, and the rapid vertical vibration of the filter elements dislodges the filter cakes which are deposited on and adhere to the vertically extending outer surfaces thereof.

In our said copending application, the manifold is mounted to the tank by means of springs. The springs provide a floating mount which provide more uniform shock waves and better shock wave transmission to the filter tubes and which increases the life of the filter inasmuch as the shock waves are not transmitted through the shelf brackets to the tank. However, for certain applications where filter durability is not so important and particularly tenacious cakes are involved, it has been found that directly supporting the manifold on shelf brackets is advantageous in that a different shock wave distribution throughout each filter element is provided.

Figure 3:
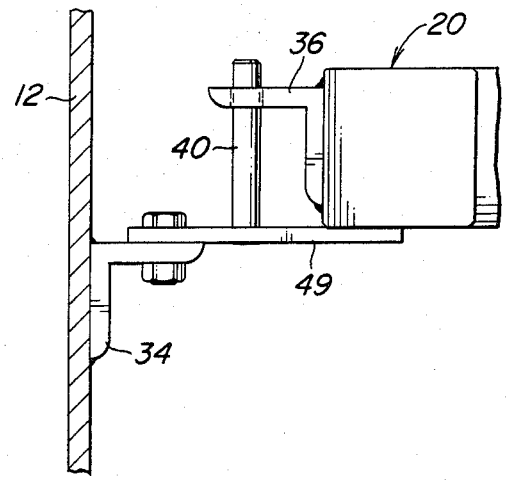
FIG. 3 is a cross-sectional view showing another method of mounting the outlet manifold to the filter tank.

In FIG. 3 there is shown another way of mounting the manifold 20 to the tank 12. In this embodiment, the manifold 20 rests on metal extender brackets 49 which are bolted to the shelf brackets 34.

In order to cause the imparted shock waves to travel longitudinally through the filter tubes it is necessary that the tubes be substantially non-compressible in the longitudinal direction, and particularly where the filter tubes include an external perforate sleeve it is important that the cores of the filter tubes not bow or ben during use. Referring to FIG. 4 there is shown a filter tube 18 which has improved structural and operational characteristics which make it well suited for use in combination with a vibratory impactor which developes vertically traveling shock waves.

As shown, the filter tube 18 is similar in overall construction to the filter tubes described in U.S. Pat. No. 3,695,443, but it differs from such tubes primarily in the improved core member 50 which provides greater structural strength, improved blow-down characteristics and better internal cleaning. The core member 50 is an extruded is a unitary member having a central, inner tube 52, an outer tube 54 concentric with the inner tube 52, and a plurality of webs 56 which interconnect the inner and outer tubes. The outer tube 54 has a plurality of longitudinal ribs 58 which are angularly spaced to provide longitudinal grooves or flutes 60 which extend throughout the full length of the core.

Mounted over the core member 50 is a grid 62 preferably in the form of a plastic seamless tube of the type described in U.S. Pat. No. 3,695,443. For some applications the grid 62 may be omitted. An upper end cap 64 has a central bore 66 which is internally threaded and has a counter bore 68 at the bottom. In addition, the cap 64 includes an annular groove 70 which is concentric with the bore 66. The upper end of the core tube 52 fits into the counterbore 68 and the outer core tube 54 fits into the groove 70 together with the upper end of the grid 62. The upper edge 56A of the web 56 abuts the bottom surface of the cap 64 between the groove 70 and the counterbore 68. The cap 64 is also formed of palstic and may be conveniently bonded to the core member 50 and to the grid 62 in a spin-welding operation.

As shown in FIG. 4, a lower end cap 72, also formed of plastic, is provided at the bottom with a threaded blind hole 74 used for attaching the lower end of the tube to a spacer grid in some applications. An annular groove 76 is provided in the top of the cap 72 for receiving the lower end of the outer tube portion 54 of the core member and the lower end of the grid 62. The lower end cap 72 may also be bonded to the core member 50 and to the grid 62 in a spin-welding operation. The lower edge of the 56 and the inner tube portion 52 are spaced about one-quarter to one-half inch from the top surface of the end cap 72.

Two rows of apertures 78 are provided in the outer tube portion 54 near the bottom thereof for carrying liquid from the flutes 60 into the lower end of the core. The liquid then flows under the wall of the center tube and travels up through the tube 52 to the outlet manifold to which the top of the tube is suitably coupled as by means of short lengths of plastic pipe 80 as shown in FIGS. 1 and 2. Two of the apertures, one above the other, are provided for each flute. A fine mesh sleeve 82 of cloth or other material suitable for supporting a precoat layer snuggly fits over the tube as shown in FIG. 5 and is sealably fastened near its ends to the top and bottom end caps. U.S. Pat. No. 3,695,443 discloses what is for some applications a preferred method of fastening the sleeve 82 to the two end caps by means of cords. However, clamps or other means may be used for this purpose.

During a filtration cycle, liquid flows through a precoat cake and a filter cake deposited on the sleeve to the sleeve 82 and through the sleeve 82 into the flutes 60. The filtered liquid then flows down through the flutes and through the passageways 78 into the cavity within the core. At the outset of the filter cycle when the tank is initially filled, air is trapped in the space between the inner and outer core tubes 52 and 54 above the passageways 78 and is compressed therein as the liquid level in the tank rises and the tank pressure increases. When the pressure is subsequently relieved at the end of the filtration cycle, the trapped air expands to push the trapped liquid and any sediment resting on the top surface of the bottom end cap 72 up through the tube 52.

In the embodiment of the invention shown in FIG. 6, the inner core tube 52 is provided with a vent opening 84 near the top, and the webs 56 are provided with grooves or notches 86 at the top for interconnecting the spaces in the core between the webs. In this embodiment of the invention there is no entrapment of air as in the embodiment of FIG. 4. While the advantage provided by the air bump action during cleaning is lost, there is no dead space within the core. Accordingly, the embodiment of FIG. 6 finds use where continuous circulation of the effluent is desired.

Referring to FIG. 7, there is shown a filter tube 18 mounted to and suspended from the manifold 20. Mounted over the outer sleeve 82 are a plurality of clamping bands 88 which compress the sleeve 82 tightly against the grid 62 or against the ribs 58 if a grid is not used. These clamping bands 88 prevent relative movement between the rigid core and the mesh sleeve 82 during vibration of the filter tube. In a preferred embodiment of the invention the bands are formed of rubber or other elastomeric material. The optimum distance between the bands 88 will vary with the material from which the mesh sleeve is made. However, with filter tubes which have an external diameter of about two and one-half inches and a length of twelve feet, a distance between bands of between eighteen inches and twenty-four inches have been found to provide excellent cake removal during the vibration cycle. Hence, it is believed that a band spacing of about seven to ten times the diameter of the filter tube will provide good wave transmission to the mesh sleeve.

OPERATION

In a typical filtration cycle, the drain is closed and with the air inlet at the top open to the atmosphere the filtrate inlet is opened so that a liquid slurry of a precoat material enters the bottom of the tank through the inlet 14. When the tank is filled, the air inlet at the top is closed and the precoat liquid slurry flows through the filter tubes into the manifold 20 out through the effluent outlet 16. Where a sufficiently thick layer of precoat cake has been deposited on the filter tubes 18, the filter is put on line and the filtrate to be filtered then passes through the precoat cake, the filter tubes, the manifold and out through the outlet 16.

When the filter cake deposited on the tubes has reached a thickness wherein the efficiency of operation of the filter would be impaired from a further cake buildup, the air inlet 24 at the top is connected to a source of air at a pressure slightly greater than the pressure in the tank. The air pressure may be somewhere between five and ten p.s.i. greater than the pressure in the tank at the time. The filtrate inlet to the port 14 is then closed and the inlet port 14 is connected by external valving back to the filtrate source or to a sewer or some other location. The air entering the top of the tank expands to force the liquid in the tank either through the filter tubes to the outlet 16 or through the inlet 14 at the bottom which now acts as a drain. As the liquid level falls below the tops of the filter tubes air begins to flow through the filter cakes thereby to dry the cakes and also to blow the heel from inside the filter tubes up through the central tubes and out through the manifold.

After the filter cakes have thus been blown dry, for some applications a leachant liquid may then be supplied to the tank via the inlet 14 and with the air inlet closed the liquid will then flow through the filter cakes to wash the cakes. It has been found that approximately two to three cake volumes of leaching liquid passing through the filter tubes will provide satisfactory leaching.

If the leaching step is used, then the blow down operation is repeated until the cake is again dry. The air inlet is then closed, the tank is depressurized in the nomal manner, and the drain at the bottom is opened if a dry cake discharge is to be provided. As mentioned above, a drain opening larger than that shown in FIG. 1 is required for a dry cake discharge. One such drain opening is shown in U.S. Pat. No. 3,212,643. The vibratory impactor is then operated to vertically vibrate the filter elements and shake the filter cakes therefrom. Preferably the impactor is operated in short spurts or its operation can be modulated as described in U.S. Pat. No. 3,867,291 assigned to the same assignee as the present invention.

Where a wet cake discharge is used, after the leaching step and the subsequent blow down step, any suitable liquid may be supplied to the tank to fill it to a level above the tops of the filter tubes and the vibratory impactor may then be operated to shake the filter cake loose from the filter elements wherefor it mixes with the liquid in the tank. The drain may then be opened to discharge cake and liquid mixture as a slurry.

Another alternative mode of operation is to vibrate the filter elements immediately after the blow down step with or without leaching but with the drain valve closed. This will cause the dry filter cake to fall to the bottom of the tank and be collected there. Thereafter a liquid may be supplied to the tank via the inlet 14 and discharged through the bottom drain as a slurry.

Where the filter is to be used solely as a thickner, after a filter cake of desired thickness has been built up on the filter elements, the filtrate inlet can be closed and the vibrator immediately operated to shake the cake loose from the filter elements while the tank is filled with the filtrate. The drain is then opened to remove the slurry which in this case will be a substantially thicker filtrate.

It may thus be seen that the filter of the present invention may be operated in many different ways for use in many different applications. In all such cases, however, it is desirable that a highly efficient filter cake removal operation be provided, and the filter of the present invention is well suited for that purpose.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A filter, comprising in combination,
   a filter tank enclosing a filter chamber,
   a liquid inlet opening into said tank through which a filtrate may be introduced into said chamber,
   a rigid outlet manifold having a passageway therein,
   an outlet from said tank connected to said passageway in said manifold,
   shelf means affixed to said tank for supporting said outlet manifold in said chamber,
   said manifold resting directly on said shelf means,
   a plurlity of longitudinally incompressible filter elements suspended from said manifold in vertically oriented, mutually parallel positions,
   said elements having internal cavities communicating with said passageway in said manifold, and
   vibratory impactor means connected to said manifold for imparting vertically directed shock waves to said manifold,
   whereby a shear force is exerted between said filter elements and filter cakes deposited thereon to release said cakes from said filter elements.

2. A filter according to claim 1, comprising
   guide means for guiding said manifold for movement in a vertical direction in said tank.

3. A filter according to claim 2 wherein said guide means comprises
   a plurality of rigid brackets fixed to said tank in spaced apart relationship, and
   upstanding pin means slidably extending through vertical openings in said manifold.

4. A filter according to claim 3, wherein said manifold comprises a plurality of rigid tubular members fixedly connected together in horizontal relationship.

5. A filter according to claim 1 wherein said filter elements each comprises
   a core including a unitary plastic core member having a central longitudinal tube, an outer tube concentric with said central tube, a plurality of longitudinally extending webs interconnecting said tubes, and said outer tube having a plurality of longitudinally extending ribs defining parallel flutes on an exterior surface thereof,
   first and second end caps affixed to first and second ends of said core,
   said first end cap having a passageway therethrough opening into a first end of said central tube,
   said second end cap being spaced from a second end of said central tube,
   passageway means through said outer tube connecting said flutes to the second end of said central tube, and
   a perforate sleeve overlying said core and sealably connected to said first and second end caps.

6. A filter according to claim 5, wherein said filter elements each further comprising
   said perforate sleeve is disposed over said core and sealed to an exterior of said first and second end caps, and
   at least one band means surrounding said sleeve at a location between said end caps compressing said sleeve into vibration transmitting relationship with said core.

7. A filter element according to claim 1, wherein said vibratory impactor means is fixedly mounted to said manifold.

8. A tubular filter element, comprising
   a molded, one piece plastic core member having a central longitudinal tube portion, an outer tube portion having an exterior surface, said outer tube portion being concentric with said central tube portion, a plurality of longitudinally extending rectilinear webs interconnecting said tube portions, and said outer tube portion having a plurality of longitudinally extending ribs defining parallel flutes on the exterior surface thereof,
   first and second caps affixed to first and second ends of said core,
   said first end cap havig a passageway therethrough opening into a first end of said central tube portion,
   said second end cap being spaced from a second end of said central tube portion,
   passageway means through said outer tube portion connecting said flutes to the second end of said central tube portion, and
   a perforate sleeve overlying said core and sealably connected to said first and second end caps.

9. A tubular filter element according to claim 8 wherein
   said passageway through said end cap is a centrally disposed bore, and
   an upper end of said central tube portion fits into a counterbore at an end of said bore.

10. A tubular filter element according to claim 8, comprising
    passageway means through said webs in proximity to said first end cap, and
    passageway means through said central tube portion in proximity to said first end cap.

11. A tubular filter element according to claim 8, comprising
    said perforate sleeve is disposed over said core and sealed to said first and second end caps, and
    at least one band means surrounding said sleeve at a location between said end caps compressing said sleeve into vibration transmitting relationship with said core.

12. A tubular filter element according to claim 11, comprising
    a grid sleeve interposed between said core member and said perforate sleeve.

13. A filter, comprising in combination
    a filter tank enclosing a filter chamber,
    a liquid inlet opening into said tank through which a filtrate may be introduced into said chamber,
    a rigid tubular outlet manifold loosely mounted in said tank, and having a passageway therein an outlet from said tank connected to the passageway in said manifold, a plurality of longitudinally incompressible filter elements fixedly mounted to said manifold in mutually parallel relationship, said filter elements having cavities therein connected to the passageway in said manifold and perforate external surfaces on which filter cakes are deposited during operation of said filter as liquid flows from said chamber through said surfaces to said outlet, and vibratory impactor means connected to said manifold for imparting to said manifold vibratory shock waves in a direction parallel to said external surfaces to exert shear forces at interfaces of said filter cakes and said perforate external surfaces to separate said filter cakes from said filter elements.

* * * * *